United States Patent
Ando et al.

(10) Patent No.: US 11,798,578 B2
(45) Date of Patent: Oct. 24, 2023

(54) PARALINGUISTIC INFORMATION ESTIMATION APPARATUS, PARALINGUISTIC INFORMATION ESTIMATION METHOD, AND PROGRAM

(71) Applicant: NIPPON TELEGRAPH AND TELEPHONE CORPORATION, Tokyo (JP)

(72) Inventors: Atsushi Ando, Tokyo (JP); Hosana Kamiyama, Tokyo (JP); Satoshi Kobashikawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 357 days.

(21) Appl. No.: 17/287,102

(22) PCT Filed: Oct. 8, 2019

(86) PCT No.: PCT/JP2019/039572
§ 371 (c)(1),
(2) Date: Apr. 20, 2021

(87) PCT Pub. No.: WO2020/085070
PCT Pub. Date: Apr. 30, 2020

(65) Prior Publication Data
US 2021/0398552 A1 Dec. 23, 2021

(30) Foreign Application Priority Data
Oct. 22, 2018 (JP) .................................. 2018-198427

(51) Int. Cl.
*G10L 15/00* (2013.01)
*G10L 25/63* (2013.01)
(Continued)

(52) U.S. Cl.
CPC .............. *G10L 25/63* (2013.01); *G10L 15/02* (2013.01); *G10L 15/16* (2013.01)

(58) Field of Classification Search
None
See application file for complete search history.

(56) References Cited

U.S. PATENT DOCUMENTS 10,049,664 B1 * 8/2018 Indyk ...................... G10L 15/02
10,135,989 B1 * 11/2018 Indyk ...................... G10L 15/14
(Continued)

OTHER PUBLICATIONS

Tzirakis et al. (2017) "End-to-End Multimodal Emotion Recognition Using Deep Neural Networks" IEEE Journal of Selected Topics in Signal Processing, vol. 11, No. 8, pp. 1301-1309.

*Primary Examiner* — Satwant K Singh (57) ABSTRACT

To increase the accuracy of paralinguistic information estimation. A paralinguistic information estimation model storage unit 20 stores a paralinguistic information estimation model outputting, with a plurality of independent features as inputs, paralinguistic information estimation results. A feature extraction unit 11 extracts the features from an input utterance. A paralinguistic information estimation unit 20 estimates paralinguistic information of the input utterance from the features extracted from the input utterance, by using the paralinguistic information estimation model. The paralinguistic information estimation model includes, for each of the features, a feature sub-model outputting information to be used for estimation of paralinguistic information, based only on the feature, for each of the features, a feature weight calculation unit calculating a feature weight, based on an output result of the feature sub-model, for each of the features, a feature gate weighting the output result from the feature sub-model with the feature weight and outputting a result, and a result integration sub-model esti-
(Continued)

mating the paralinguistic information, based on output results from all the feature gates.

20 Claims, 6 Drawing Sheets

(51) Int. Cl.
*G10L 15/02* (2006.01)
*G10L 15/16* (2006.01)

(56) References Cited

U.S. PATENT DOCUMENTS

| | | | |
|---|---|---|---|
| 2018/0032612 A1* | 2/2018 | Kariman | G06F 16/164 |
| 2018/0240535 A1* | 8/2018 | Harper | G10L 25/66 |
| 2018/0254041 A1* | 9/2018 | Harper | G10L 25/51 |
| 2019/0362711 A1* | 11/2019 | Nosrati | G06N 20/10 |
| 2021/0166679 A1* | 6/2021 | Ando | G10L 25/30 |
| 2022/0122584 A1* | 4/2022 | Ando | G10L 15/06 |
| 2023/0069908 A1* | 3/2023 | Ando | G10L 25/63 |
| 2023/0147985 A1* | 5/2023 | Totsuka | G06N 20/00 706/12 |

\* cited by examiner

PARALINGUISTIC INFORMATION ESTIMATION APPARATUS, PARALINGUISTIC INFORMATION ESTIMATION METHOD, AND PROGRAM

CROSS-REFERENCE TO RELATED APPLICATIONS

This application is a U.S. 371 Application of International Patent Application No. PCT/JP2019/039572, filed on 8 Oct. 2019, which application claims priority to and the benefit of JP Application No. 2018-198427, filed on 22 Oct. 2018, the disclosures of which are hereby incorporated herein by reference in their entireties.

TECHNICAL FIELD

This invention relates to a technique for estimating paralinguistic information from speech.

BACKGROUND ART

There is a need for techniques for estimating paralinguistic information (e.g., whether utterance intent is interrogative or declarative and/or whether emotion is any of pleasure, sorrow, anger, and calm) from speech. Paralinguistic information is applicable, for example, to sophistication of speech translation (e.g., providing Japanese-English translation with accurate understanding of speaker's intent for even a straightforward utterance such as understanding the Japanese utterance "Asu" as interrogative intent "Tomorrow?" and translating the Japanese utterance as "Is it tomorrow?", or understanding the Japanese utterance as declarative intent "tomorrow" and translating the Japanese utterance as "It is tomorrow."), interaction control while considering the emotions of the other party in speech interaction, and the like (e.g., in a case that the other party is angry, changing the topic).

As a related art, a paralinguistic information estimation technique using a plurality of independent features is described in NPL 1 and the like. In NPL 1, based on an audio feature (speech waveform) and a video feature (an image sequence of a plurality of frames), emotion dimension values (two kinds i.e., valence: comfort-discomfort, and arousal: arouse-sleep) of a speaker are estimated. Also known is a technique for estimating paralinguistic information of a speaker, based on chronological information of a prosodic feature, such as voice pitch per short time period, and chronological information of a linguistic feature, such as spoken words. Such techniques of combining a plurality of features enable recognition of paralinguistic information at higher accuracy than that by techniques using a single feature.

Figure 1:
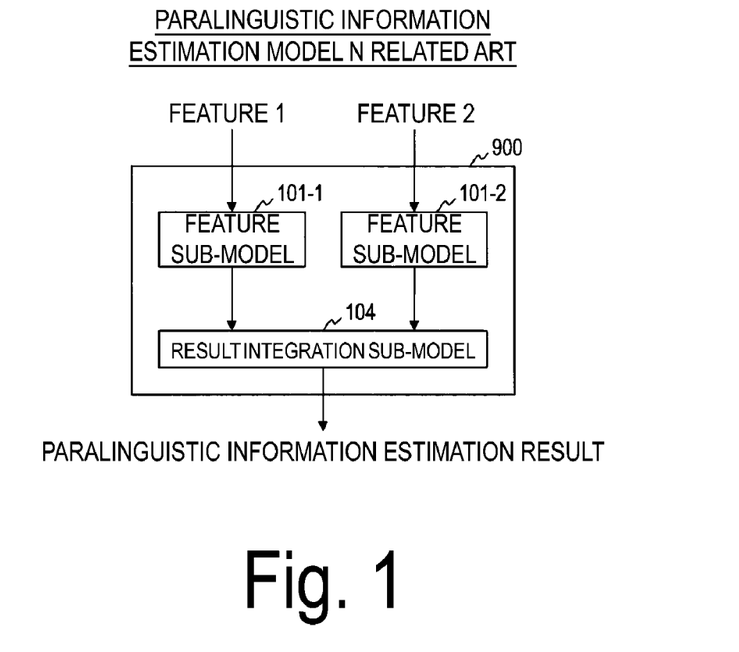
FIG. 1 is a diagram illustrating a paralinguistic information estimation model in the related art.

FIG. 1 illustrates a related art of a paralinguistic information estimation model using a plurality of independent features. This paralinguistic information estimation model 900 is configured of feature sub-models 101 each configured to estimate paralinguistic information from a feature and a result integration sub-model 104 configured to integrate outputs from the feature sub-models 101 and output a final paralinguistic information estimation result. This configuration corresponds, for example, in an utterance intent estimation, to a process of estimating whether interrogative characteristics or declarative characteristics are included in a prosodic feature (e.g., whether the end of a sentence is raised in pitch) and whether interrogative characteristics or declarative characteristics appear in a linguistic feature (e.g., whether an interrogative is included) and then integrating the results to estimate whether the utterance intent is interrogative or declarative. A recent mainstream is a paralinguistic information estimation model based on a deep learning with sub-models each configured of a model based on deep learning to integrally learn the entire paralinguistic information estimation model.

CITATION LIST

Non Patent Literature

NPL 1: Panagiotis Tzirakis, George Trigeorgis, Mihalis A. Nicolaou, Bjorn W. Schuller, Stefanos Zafeiriou, "End-to-End Multimodal Emotion Recognition Using Deep Neural Networks", IEEE Journal of Selected Topics in Signal Processing, vol. 11, No. 8, pp. 1301-1309, 2017.

SUMMARY OF THE INVENTION

Technical Problem

The characteristics of paralinguistic information do not necessarily appear in all features and may appear in one or some features in some cases. For example, in utterance intent, there exists an utterance which is given with the end of a sentence being raised in pitch but is a declarative sentence (i.e., the characteristics of interrogative utterance appear only in a prosodic feature), and such an utterance is considered as an interrogative utterance. Also, for example, with respect to emotion, there exists an utterance with extreme anger appearing in the way of speaking and/or words although it appears calm in facial expression, and such an utterance is considered as an angry utterance.

However, in the related art, it is difficult to correctly learn an utterance with the characteristics of paralinguistic information appearing only in one or some features. This is because in the paralinguistic information estimation model of the related art, model learning is performed as if all features indicate the same characteristics of the paralinguistic information. For example, in a case of performing learning of an interrogative utterance, learning is performed as if the characteristics of an interrogative utterance appear in both the prosodic feature and the linguistic feature. For this reason, even in utterance with the characteristics of interrogative utterance appearing only in the prosodic feature, model learning is performed by considering the characteristics of interrogative utterance also appearing in the linguistic feature, and this utterance serves as noise in correctly learning the characteristics of an interrogative utterance in the linguistic feature. As a result, in the related art, in a case that an utterance with the characteristics of paralinguistic information appearing only in one or some features is included in learning data, correct learning of paralinguistic information estimation model is not possible, and this reduces the accuracy of paralinguistic information estimation.

In view of the above-described technical problem, an object of the present invention is to, even in a case that an utterance with the characteristics of paralinguistic information appearing only in one or some features is included in learning data in paralinguistic information estimation using a plurality of independent features, correctly learn paralinguistic information estimation model to accurately estimate paralinguistic information.

Means for Solving the Problem

To solve the above-described problem, a paralinguistic information estimation apparatus according to an aspect of the present invention is a paralinguistic information estimation apparatus estimating paralinguistic information from an input utterance. The paralinguistic information estimation apparatus includes a paralinguistic information estimation model storage unit configured to store a paralinguistic information estimation model outputting, with a plurality of independent features as inputs, paralinguistic information estimation results, a feature extraction unit configured to extract the plurality of independent features from an input utterance, and a paralinguistic information estimation unit configured to estimate paralinguistic information of the input utterance from the plurality of independent features extracted from the input utterance, by using the paralinguistic information estimation model. The paralinguistic information estimation model includes, for each of the plurality of independent features, a feature sub-model configured to output information to be used for estimation of paralinguistic information, based only on the feature, for each of the plurality of independent features, a feature weight calculation unit configured to calculate a feature weight representing whether to use the feature for estimation of paralinguistic information, based on an output result of the feature sub-model, for each of the plurality of independent features, a feature gate configured to weight the output result from the feature sub-model with the feature weight and output a result, and a result integration sub-model configured to estimate the paralinguistic information, based on output results from all the feature gates.

Effects of the Invention

According to the present invention, it is possible to, even for an utterance with the characteristics of paralinguistic information appearing only in one or some features in paralinguistic information estimation using a plurality of independent features, correctly learn paralinguistic information estimation model to accurately estimate paralinguistic information. This consequently increases the accuracy of paralinguistic information estimation.

DESCRIPTION OF EMBODIMENTS

Embodiments of the present invention will be described in detail below with reference to the drawings. Note that components having the identical function are given the identical reference numerals, and redundant descriptions are omitted.

A point of the present invention is to introduce a feature gate that determines whether to use information of each feature for paralinguistic information estimation, in consideration of the possibility that the characteristics of paralinguistic information appear only in one or some features. To perform model learning for an utterance with the characteristics of paralinguistic information appearing only in one or some features, it is considered to be only required to introduce a mechanism capable of selecting, for each feature, whether to use the feature for paralinguistic information estimation. For example, the following mechanism is introduced: in a case that particular characteristics of paralinguistic information are prominent in a certain feature, paralinguistic information estimation is performed by using the feature, while, in a case that particular characteristics of paralinguistic information do not appear in another feature, paralinguistic information estimation is performed without using the feature. This selection mechanism is implemented as feature gates in the present invention.

Figure 2:
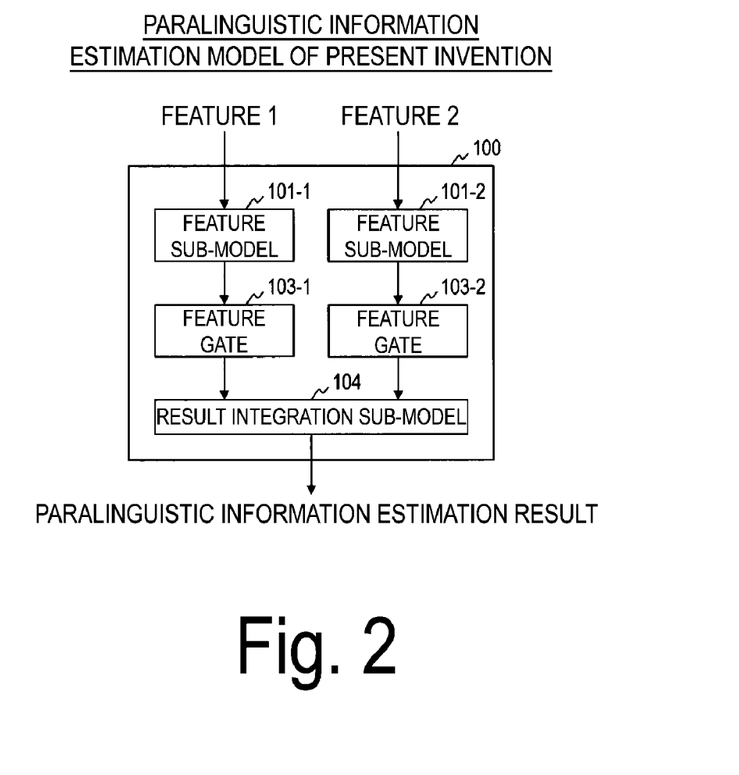
FIG. 2 is a diagram illustrating a paralinguistic information estimation model according to an embodiment of the present disclosure.

FIG. 2 illustrates an example of a paralinguistic information estimation model according to an embodiment of the present disclosure. This paralinguistic information estimation model 100 is configured of feature sub-models 101 similar to those in a related art, feature gates 103 each configured to determine whether to use an output from a corresponding one of the feature sub-model 101 for paralinguistic information estimation, and a result integration sub-model 104 configured to output a final paralinguistic information estimation result, based on outputs from the feature gates 103.

Each of the feature gates 103 serves to determine whether to input an output from the corresponding feature sub-model 101 to the result integration sub-model 104. The feature gate 103 makes a determination about output, based on equation (1).

[Math. 1]

$$y_k = w_k \circ x_k \quad (1)$$

Here, k is a feature number (k=1, 2, . . . ), $y_k$ denotes a feature gate output vector, $x_k$ denotes a feature gate input vector (feature sub-model output result), and $w_k$ denotes a feature gate weight vector.

$$\circ \quad [\text{Math. 2}]$$

This represents an element product. In a case that the feature gate weight vector $w_k$ is a unit vector, the feature sub-model output result $x_k$ is directly output to the result integration sub-model 104. In a case that the feature gate weight vector $w_k$ is a zero vector, the feature sub-model output result $x_k$ is converted into zero and then output to the result integration sub-model 104. Thus, by controlling the feature gate weight vector $w_k$ corresponding to each feature, it is possible to perform learning of a paralinguistic information estimation model and estimation of paralinguistic information so as to use one feature while not using another feature. Note that, in a case of a paralinguistic information estimation model based on deep learning, the feature gate weight vector $w_k$ can also be considered as one model parameter, and hence it is possible to integrally learn the entire model while also including the feature gate weight vector $w_k$.

Specifically, paralinguistic information is estimated in the following procedure.

1. Prepare a paralinguistic information estimation model configured of a sub-model for each feature, a feature gate for each feature, and a result integration sub-model with a plurality of independent features as inputs.

2. Learn a paralinguistic information estimation model. In a case of a paralinguistic information estimation model based on deep learning, the entire model including weight vectors of feature gates is integrally learned by an error back-propagation method. In other cases, feature gates cannot be learned, so weight vectors of feature gates are determined by a manual rule. For example, in a case that an output result from a sub-model for each feature is the distance from an identification plane, the following rule is defined: the weight vector of a feature gate is set as a zero vector for the absolute value of the distance from the identification plane being 0.5 or smaller; and the weight vector of a feature gate is set as a unit vector for the absolute value of the distance from the identification plane being greater than 0.5. In this case, two-stage learning, i.e., learning a sub-model for each feature first and then learning a result integration sub-model, is performed.

3. Input a plurality of independent features into the learned paralinguistic information estimation model, and obtain a paralinguistic information estimation result for each utterance.

First Embodiment

In the present embodiment, an input utterance is intended to refer to both speech waveform information of the utterance and image information of expression (face) of the speaker of the utterance. Features used for paralinguistic information estimation of the present invention may be any two or more independent features that can be extracted from human utterance, but in the present embodiment, three kinds of features independent of one another, i.e., prosodic feature, linguistic feature, and video feature, are assumed to be used. However, only any two of these three features may be used. Alternatively, a feature using information such as, for example, biological signal information (pulses, electrodermal, or the like) may be additionally used as long as they are independent of other features.

In the present embodiment, it is possible to, as an output result from a sub-model for each feature, receive, a paralinguistic information probability for each feature, but also to receive intermediate information necessary for estimating a paralinguistic information probability for each feature (e.g., an output value from an intermediate layer in a deep neural network). It is also possible, in a case of performing learning also including weight vectors of feature gates, to dynamically change each weight vector every time an input changes instead of using a fixed value for each weight vector for all inputs. Specifically, each weight vector is calculated from an input according to equation (2) or equation (3) to dynamically change the weight vector.

[Math. 3]

$$w_k = w_x x_k + b_x \quad (2)$$

$$w_k = \sigma(w_x x_k + b_x) \quad (3)$$

Here, k denotes a feature number (k=1, 2, ...), $x_k$ denotes a feature gate input vector (feature sub-model output result), $w_k$ denotes a feature gate weight vector, $w_x$ denotes a matrix for calculation of a feature gate weight vector, $b_x$ denotes a bias for calculation of a feature gate weight vector, and $\sigma$ denotes an activation function (for example, a sigmoidal function in equation (4)), $w_x$ and $b_x$ are determined by learning in advance. Note that, in a case that x is a vector in equation (4), equation (4) is applied to each element of the vector.

[Math. 4]

$$\sigma(x) = \frac{1}{1 + e^{-x}} \quad (4)$$

By employing the above-described configuration, an operator can change the degree of use of an output result of the sub-model for each feature, according to the speaker of an input utterance and/or utterance environment (e.g., perform paralinguistic information estimation while regarding the prosodic feature as important for a speaker who is likely to express paralinguistic information in intonation, and the like). Hence, it is possible to estimate paralinguistic information highly accurately for a wider variety of inputs than those in a common estimation technique based on the weighted sum of paralinguistic information probabilities of respective features. In other words, the accuracy of paralinguistic information estimation for various utterance environments is increased.

Paralinguistic Information Estimation Model Learning Apparatus

Figure 3:
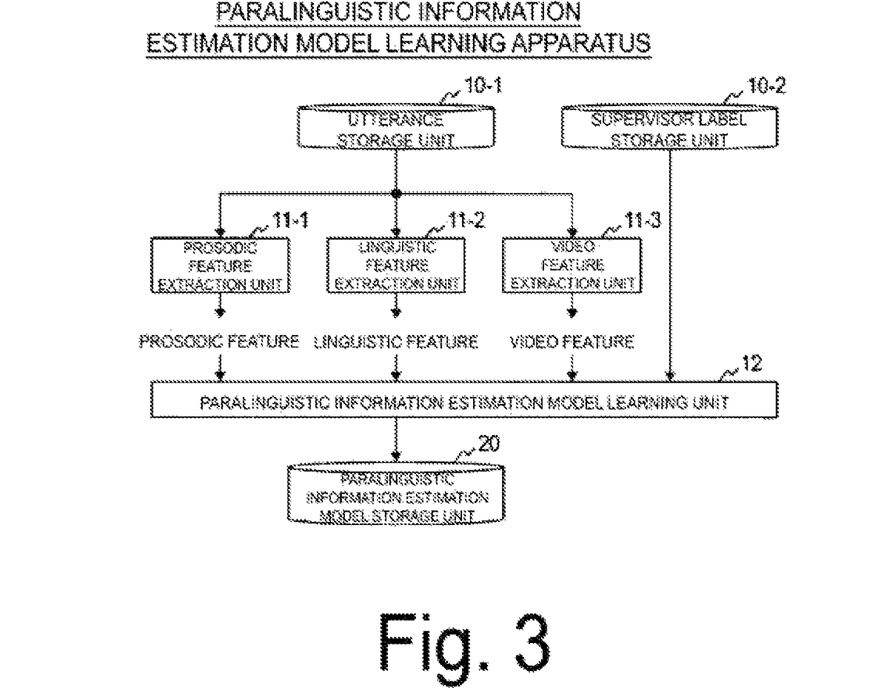
FIG. 3 is a diagram illustrating a functional configuration of a paralinguistic information estimation model learning apparatus.

A paralinguistic information estimation model learning apparatus of the first embodiment learns a paralinguistic information estimation model from an utterance to which a supervisor label is assigned. As illustrated in FIG. 3, the paralinguistic information estimation model learning apparatus includes an utterance storage unit 10-1, a supervisor label storage unit 10-2, a prosodic feature extraction unit 11-1, a linguistic feature extraction unit 11-2, a video feature extraction unit 11-3, a paralinguistic information estimation model learning unit 12, and a paralinguistic information estimation model storage unit 20. Hereinafter, the prosodic feature extraction unit 11-1, a linguistic feature extraction unit 11-2, and a video feature extraction unit 11-3 may be referred to collectively as feature extraction units 11. Each feature extraction unit 11 changes a configuration such as the number and/or details of processing according to the kinds of feature to be used for paralinguistic information estimation. The paralinguistic information estimation model learning method of the first embodiment is implemented by this paralinguistic information estimation model learning apparatus performing processing of each step illustrated in FIG. 4.

The paralinguistic information estimation model learning apparatus is a special apparatus constituted by, for example, a known or dedicated computer including a central processing unit (CPU), a main storage apparatus (random access memory (RAM)), and the like into which a special program is read. The paralinguistic information estimation model learning apparatus, for example, executes each processing under control of the central processing unit. The data input to the paralinguistic information estimation model learning apparatus and the data obtained in each processing, for example, are stored in the main storage apparatus, and the data stored in the main storage apparatus is read out, as needed, to the central processing unit to be used for other processing. At least a portion of each processing unit of the paralinguistic information estimation model learning apparatus may be constituted with hardware such as an integrated circuit. Each storage unit included in the paralinguistic information estimation model learning apparatus can be constituted with, for example, a main storage apparatus such as a random access memory (RAM), an auxiliary storage apparatus constituted with a hard disk, an optical disk, or a semiconductor memory element such as a flash memory, or a middleware such as a relational database or a key-value store.

The utterance storage unit 10-1 stores utterances to be used to learn a paralinguistic information estimation model (hereinafter, also referred to as "learning utterances"). In the present embodiment, an utterance is constituted of speech waveform information containing human utterance speech and image information containing expression of the speaker of the utterance. Concrete kinds of information constituting an utterance are determined depending on features to be used for estimation of paralinguistic information.

The supervisor label storage unit 10-2 stores supervisor labels assigned to each utterance stored in the utterance storage unit 10-1 to represent a correct answer value of paralinguistic information. The supervisor label may be assigned to each utterance manually or by using a known label classification technique. Concrete kinds of supervisor labels to be assigned are determined depending on features to be used for estimation of paralinguistic information.

Figure 4:
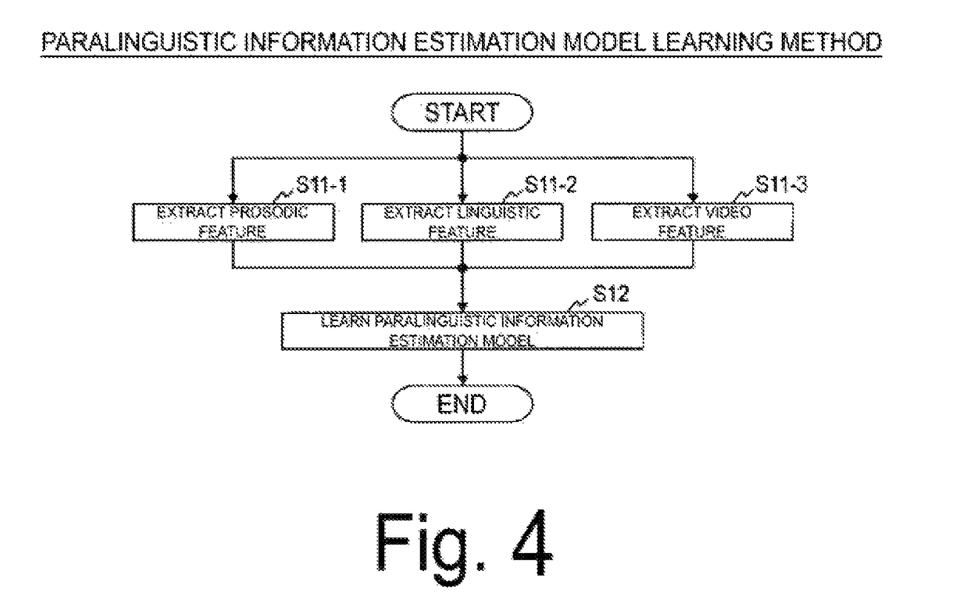
FIG. 4 is a diagram illustrating a processing procedure of a paralinguistic information estimation model learning method.

In step S11-1, the prosodic feature extraction unit 11-1 extracts a prosodic feature from speech waveform information of each utterance stored in the utterance storage unit 10-1. The prosodic feature is a vector that includes any one or more features among fundamental frequency, short time power, mel-frequency cepstral coefficients (MFCCs), zero-crossing rate, harmonics-to-noise-ratio (HNR), and mel-filter bank output. The prosodic feature may be a sequence vector of the feature(s) per time period (per frame) or may be a vector of a statistic (mean, dispersion, maximum, minimum, gradient, or the like) of the feature(s) of the entire utterance. The prosodic feature extraction unit 11-1 outputs the extracted prosodic feature to the paralinguistic information estimation model learning unit 12.

In step S11-2, the linguistic feature extraction unit 11-2 extracts a linguistic feature from speech waveform information of each utterance stored in the utterance storage unit 10-1. For the extraction of a linguistic feature, a word string acquired using a speech recognition technique or a phoneme string acquired by phoneme recognition technique is used. The linguistic feature may represent the word string or the phoneme string as a sequence vector or may be a vector representing the number of occurrences of a specific word(s) in the entire utterance or the like. The linguistic feature extraction unit 11-2 outputs the extracted linguistic features to the paralinguistic information estimation model learning unit 12.

In step S11-3, the video feature extraction unit 11-3 extracts a video feature from image information of each utterance stored in the utterance storage unit 10-1. The video feature is a vector that includes any one or more of position coordinates of a facial feature point in each frame, the component of velocity per small region calculated from an optical flow, histograms of local image gradients (histograms of oriented gradients (HOG)). The video feature may be a sequence vector of the feature(s) per time period (per frame) of equal intervals or may be a vector of a statistic (mean, dispersion, maximum, minimum, gradient, or the like) of the feature(s) of the entire utterance. The video feature extraction unit 11-3 outputs the extracted video features to the paralinguistic information estimation model learning unit 12.

In step S12, the paralinguistic information estimation model learning unit 12 learns a paralinguistic information estimation model outputting a paralinguistic information estimation result, by using the input prosodic features, linguistic features, and video features and the supervisor labels stored in the supervisor label storage unit 10-2, with a plurality of independent features as inputs. The paralinguistic information estimation model learning unit 12 stores the learned paralinguistic information estimation model in the paralinguistic information estimation model storage unit 20.

Figure 5:
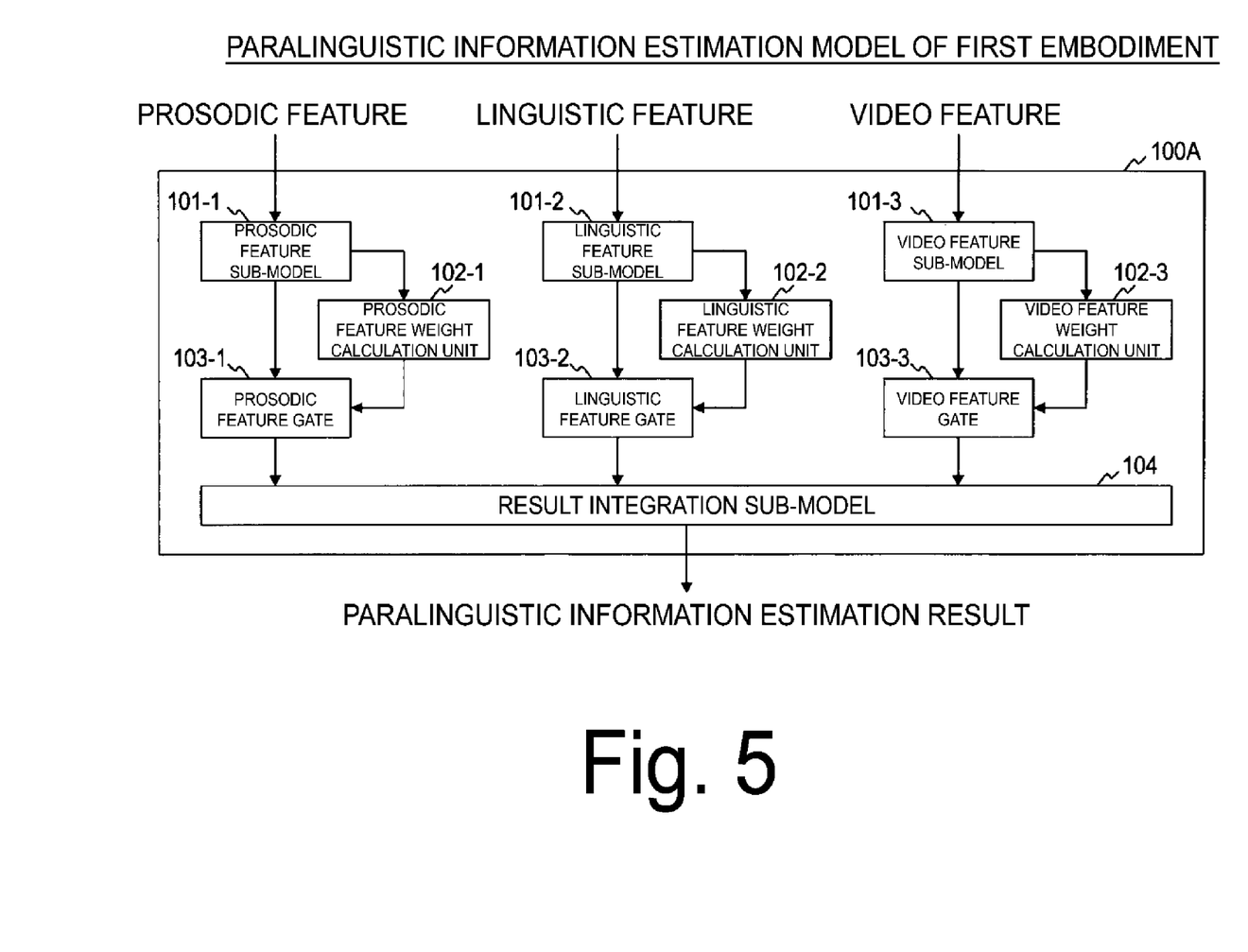
FIG. 5 is a diagram illustrating a paralinguistic information estimation model according to a first embodiment.

FIG. 5 illustrates a configuration example of a paralinguistic information estimation model utilized in the present embodiment. This paralinguistic information estimation model includes a prosodic feature sub-model 101-1, a linguistic feature sub-model 101-2, a video feature sub-model 101-3, a prosodic feature weight calculation unit 102-1, a linguistic feature weight calculation unit 102-2, a video feature weight calculation unit 102-3, a prosodic feature gate 103-1, a linguistic feature gate 103-2, a video feature gate 103-3, and a result integration sub-model 104. Hereinafter, the prosodic feature sub-model 101-1, a linguistic feature sub-model 101-2, and the video feature sub-model 101-3 may be referred to collectively as feature sub-models 101. Similarly, the prosodic feature weight calculation unit 102-1, a linguistic feature weight calculation unit 102-2, and a video feature weight calculation unit 102-3 may be referred to collectively as feature weight calculation units 102. Similarly, the prosodic feature gate 103-1, a linguistic feature gate 103-2, and a video feature gate 103-3 may be referred to collectively as feature gates 103. The feature sub-model 101 estimates paralinguistic information, based only on an input feature and outputs a paralinguistic estimation result or a mean value generated during paralinguistic estimation (hereinafter, also referred to as "information to be used for estimation of paralinguistic information"). The feature weight calculation unit 102 calculates a feature gate weight vector (hereinafter, also referred to as a "feature weight") that represents whether to use the feature for estimation of paralinguistic information, based on the output result from the feature sub-model 101. The feature gate 103 weights the output result from the feature sub-model 101 with the feature gate weight vector output from the feature weight calculation unit 102 and outputs a result. The result integration sub-model 104 estimates paralinguistic information, based on the output results from all the feature gates 103.

The paralinguistic information estimation model may be a deep neural network (DNN) or may be a support vector machine (SVM), based on deep learning, for example. In a case that a sequence vector per time period is used as a feature, an estimation model that can take into account a sequence such as a long short-term memory recurrent neural network (LSTM-RNN) may be used. Note that in a case that paralinguistic information estimation models are all configured by a technique based on deep learning including a DNN and a LSTM-RNN, the entire model also including the weight vectors of the feature gates can be considered a single network (a classification model), so it is possible to integrally learn the entire paralinguistic information estimation model by an error back-propagation method.

Figure 6:
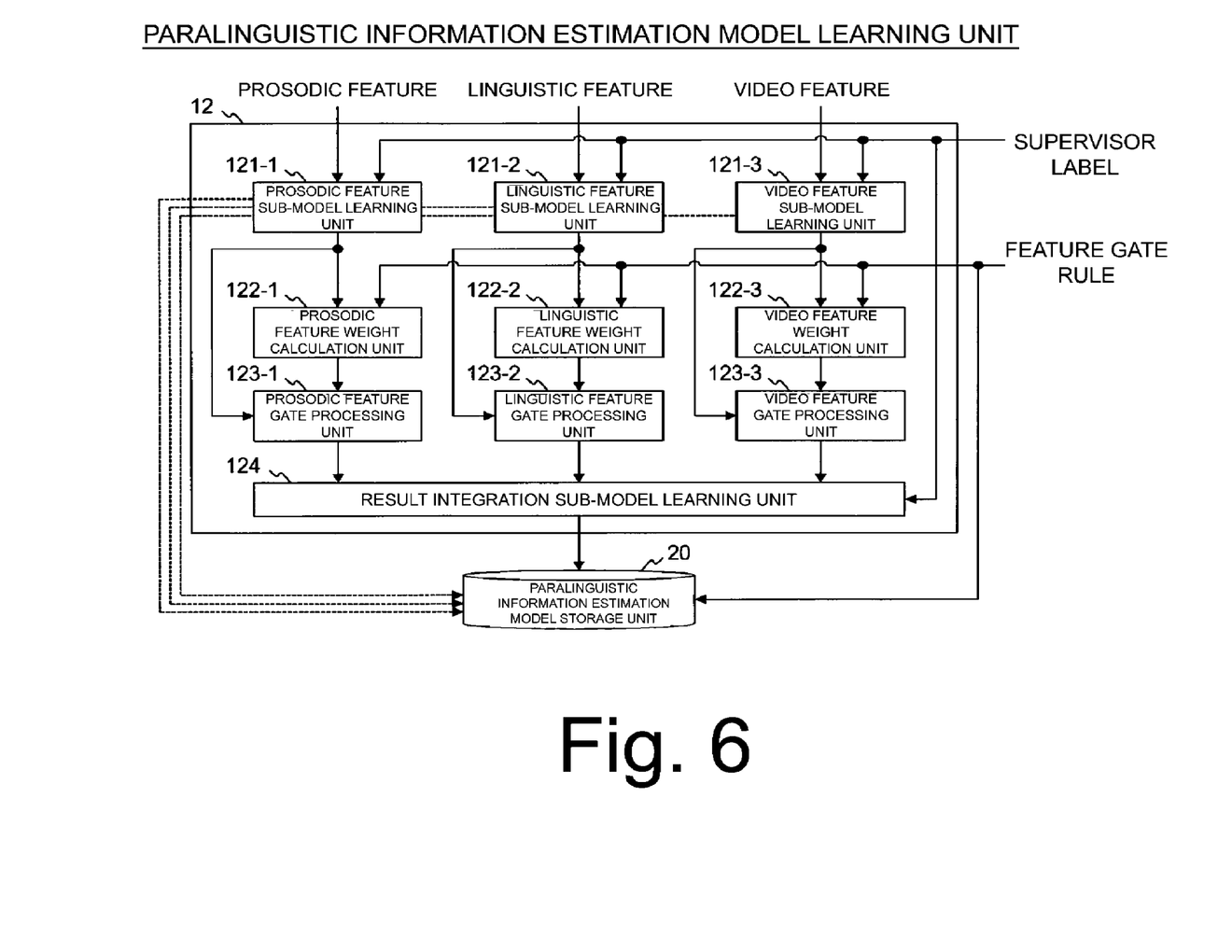
FIG. 6 is a diagram illustrating a functional configuration of a paralinguistic information estimation model learning unit.

In a case that the paralinguistic information estimation model includes a technique other than the technique based on deep learning (e.g., a case that a sub-model of each feature is configured by SVM), it is necessary to manually provide a numeric value of a weight vector of each feature gate and a rule for determining a weight vector. In this case, it is also necessary that sub-models for respective features and a result integration sub-model are learned separately. A configuration of the paralinguistic information estimation model learning unit 12 in such a case is illustrated in FIG. 6. The paralinguistic information estimation model learning unit 12 of this case includes a prosodic feature sub-model learning unit 121-1, a linguistic feature sub-model learning unit 121-2, a video feature sub-model learning unit 121-3, a prosodic feature weight calculation unit 122-1, a linguistic feature weight calculation unit 122-2, a video feature weight calculation unit 122-3, a prosodic feature gate processing unit 123-1, a linguistic feature gate processing unit 123-2, a video feature gate processing unit 123-3, and a result integration sub-model learning unit 124.

The prosodic feature sub-model learning unit 121-1 learns a prosodic feature sub-model that estimates paralinguistic information based only on a prosodic feature, from a set of a prosodic feature and a supervisor label. The prosodic feature sub-model uses, for example, an SVM but may instead use other machine learning techniques capable of class classification. An output result from the prosodic feature sub-model refers to the distance from an identification plane, for example, in a case that the prosodic feature sub-model is an SVM.

The linguistic feature sub-model learning unit 121-2 and the video feature sub-model learning unit 121-3 respectively learn a linguistic feature sub-model and a video feature sub-model similarly to the prosodic feature sub-model learning unit 121-1.

The prosodic feature weight calculation unit 122-1 uses a feature gate rule to calculate a prosodic feature gate weight vector from an output result from the prosodic feature sub-model. The feature gate rule refers to a set of a rule for determining a feature gate and a weight vector for the feature gate. The feature gate rule indicates a manually given rule, for example, in an example where the prosodic feature sub-model is an SVM, "in an output result from a prosodic feature sub-model, a prosodic feature gate weight vector is a zero vector for the absolute value of the distance from the identification plane being 0.5 or smaller, and the prosodic feature gate weight vector is a unit vector for the absolute value of the distance from the identification plane being greater than 0.5." This is equivalent to the processing of setting, by assuming that the distance from the identification plane of the SVM indicates the likeliness of an estimation result, the feature gate weight vector as a unit vector in a case that the estimation result is likely (it is highly likely that particular characteristics of paralinguistic information strongly appear in a certain feature), and setting the feature gate weight vector as a zero vector otherwise. The rule given manually is applied to the output result of the prosodic feature sub-model to calculate a prosodic feature gate weight vector for the output result. Note that the number of dimensions of the prosodic feature gate weight vector is assumed to be the same as that of prosodic feature sub-model output result (a one-dimensional vector in the example of the SVM).

The linguistic feature weight calculation unit 122-2 and the video feature weight calculation unit 122-3 respectively calculate a linguistic feature weight vector and a video feature weight vector similarly to the prosodic feature weight calculation unit 122-1.

The prosodic feature gate processing unit 123-1 uses the output result of the prosodic feature sub-model and the prosodic feature gate weight vector to calculate a prosodic feature gate output vector according to equation (1) above.

The linguistic feature gate processing unit 123-2 and the video feature gate processing unit 123-3 respectively calculate a linguistic feature gate output vector and a video feature gate output vector similarly to the prosodic feature gate processing unit 123-1.

The result integration sub-model learning unit 124 learns a result integration sub-model from a set of the prosodic feature gate output vector, the linguistic feature gate output vector, the video feature gate output vector, and the supervisor label. The result integration sub-model uses, for example, an SVM, but may instead use other machine learning techniques capable of class classification.

Paralinguistic Information Estimation Apparatus

Figure 7:
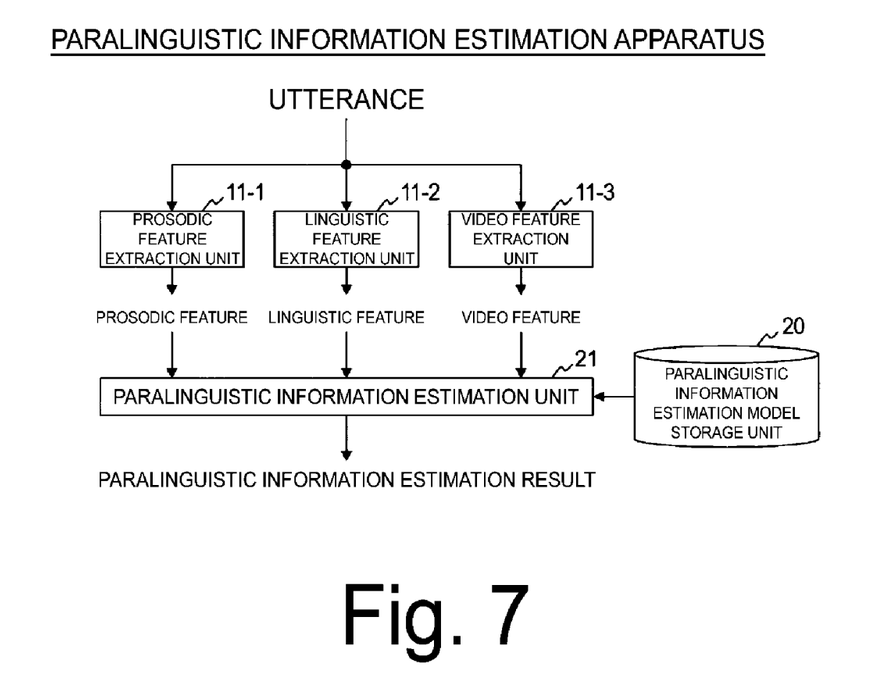
FIG. 7 is a diagram illustrating a functional configuration of a paralinguistic information estimation apparatus.

A paralinguistic information estimation apparatus of the first embodiment estimates paralinguistic information from an input utterance by using learned paralinguistic information estimation models. As illustrated in FIG. 7, the paralinguistic information estimation apparatus includes the prosodic feature extraction unit 11-1, the linguistic feature extraction unit 11-2, the video feature extraction unit 11-3, the paralinguistic information estimation model storage unit 20, and a paralinguistic information estimation unit 21. As paralinguistic information estimation method of the first embodiment is implemented by this paralinguistic information estimation apparatus performing processing of each step illustrated in FIG. 8.

The paralinguistic information estimation apparatus is a special apparatus constituted by, for example, a known or dedicated computer including a central processing unit (CPU), a main storage apparatus (random access memory (RAM)), and the like into which a special program is read. The paralinguistic information estimation apparatus, for example, executes each processing under control of the central processing unit. The data input to the paralinguistic information estimation apparatus and the data obtained in each processing, for example, are stored in the main storage apparatus, and the data stored in the main storage apparatus is read out, as needed, to the central processing unit to be used for other processing. At least a portion of each processing unit of the paralinguistic information estimation apparatus may be constituted with hardware such as an integrated circuit. Each storage unit included in the paralinguistic information estimation apparatus can be constituted with, for example, a main storage apparatus such as a random access memory (RAM), an auxiliary storage apparatus constituted with a hard disk, an optical disk, or a semiconductor memory element such as a flash memory, or a middleware such as a relational database or a key-value store.

Figure 8:
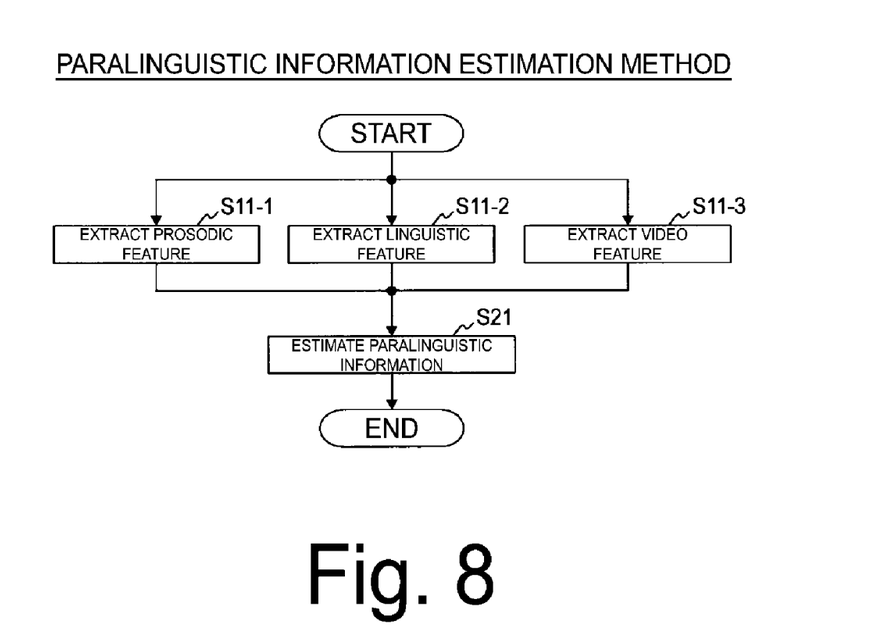
FIG. 8 is a diagram illustrating a processing procedure of a paralinguistic information estimation method.

In step S11-1, the prosodic feature extraction unit 11-1 extracts a prosodic feature from speech waveform information of an input utterance. It is only required that extraction of a prosodic feature be performed similarly to the paralinguistic information estimation model learning apparatus. The prosodic feature extraction unit 11-1 outputs the extracted prosodic feature to the paralinguistic information estimation unit 21.

In step S11-2, the linguistic feature extraction unit 11-2 extracts a linguistic feature from the speech waveform information of the input utterance. It is only required that extraction of a linguistic feature be performed similarly to the paralinguistic information estimation model learning apparatus. The linguistic feature extraction unit 11-2 outputs the extracted linguistic feature to the paralinguistic information estimation unit 21.

In step S11-3, the video feature extraction unit 11-3 extracts a video feature from image information of the input utterance. It is only required that extraction of a video feature be performed similarly to the paralinguistic information estimation model learning apparatus. The video feature extraction unit 11-3 outputs the extracted video feature to the paralinguistic information estimation unit 21.

In step S21, the paralinguistic information estimation unit 21 estimates paralinguistic information of the utterance, based on the prosodic feature, the linguistic feature, and the video feature extracted from the input utterance. A learned paralinguistic information estimation model stored in the paralinguistic information estimation model storage unit 20 is used for the estimation. In a case that the paralinguistic information estimation model is a model based on deep learning, a paralinguistic information estimation result is obtained by forward propagating each feature. In a case that the paralinguistic information estimation model is not a model based on deep learning, each feature is input to the corresponding feature sub-model, the corresponding feature gate rule is applied to an output result from each feature sub-model to determine a feature gate weight vector, and a result obtained by getting an element product of the feature gate weight vector and the output result of the feature sub-model according to equation (1) above is input to the result integration sub-model, to thereby obtain a paralinguistic information estimation result.

Second Embodiment

In the first embodiment, a feature gate weight vector of a certain feature is determined from an output result from the feature sub-model of the feature. This is a configuration in which, for example, in a case of determining that particular characteristics of paralinguistic information strongly appear in the prosodic feature, the prosodic feature is used for paralinguistic information estimation.

In the second embodiment, a feature gate weight vector of a certain feature is determined from output results from the feature sub-models of all the features. Determining the feature gate weight vector in consideration of the output results of the feature sub-models of all the features, makes it easier to distinguish which feature information is to be utilized for paralinguistic information estimation. Hence, the accuracy of paralinguistic information estimation is increased even for an utterance in which characteristics of paralinguistic information slightly appear in each feature. This is because, for example, in a case that particular characteristics of paralinguistic information slightly appear both in the prosodic feature and the linguistic feature, a paralinguistic information estimation apparatus of the second embodiment compares how the characteristics appear in the prosodic feature and the linguistic feature and can utilize, for paralinguistic information estimation, the feature in which the characteristics appear more prominently.

Figure 9:
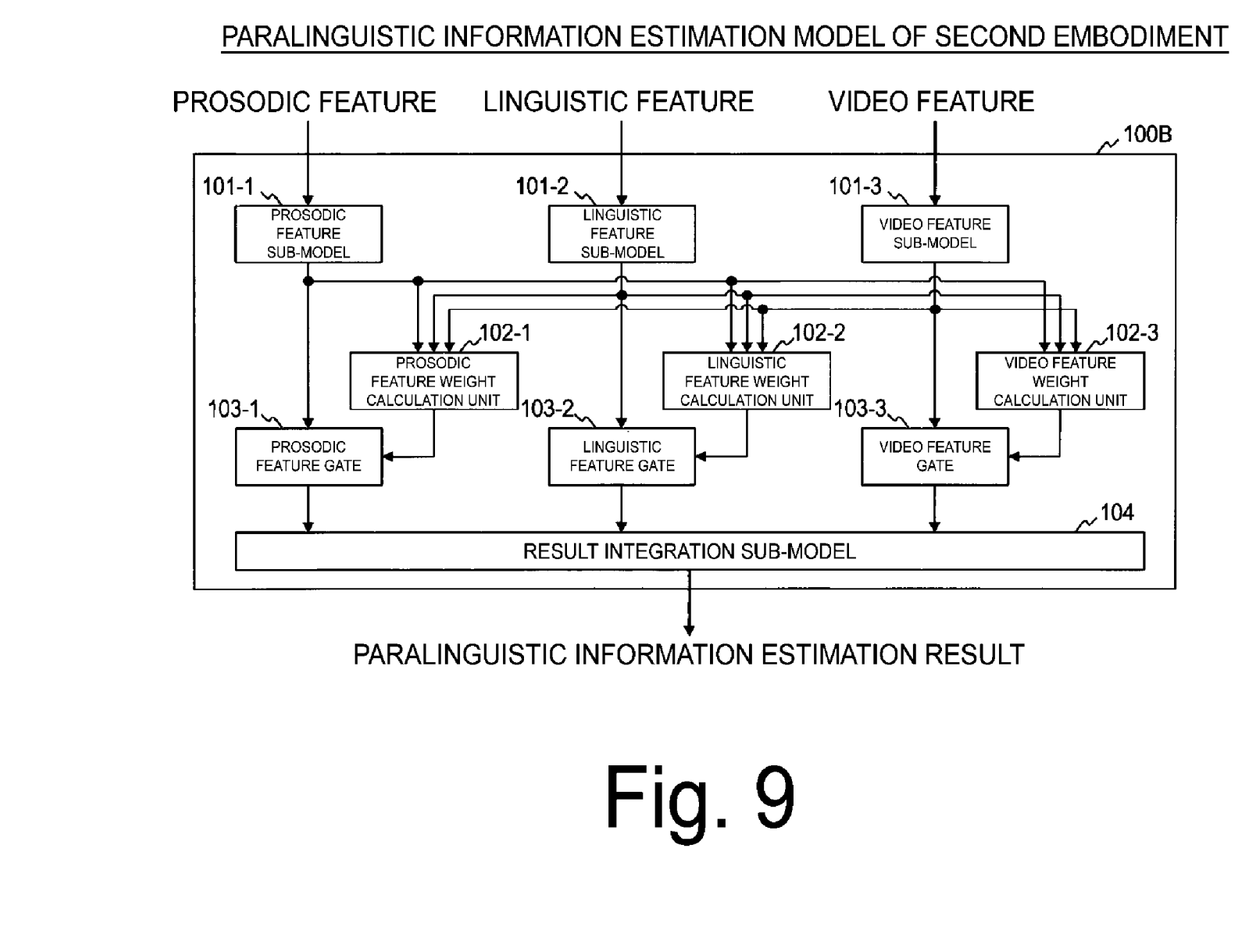
FIG. 9 is a diagram illustrating a paralinguistic information estimation model according to a second embodiment.

As illustrated in FIG. 9, a paralinguistic information estimation model of the second embodiment is configured to input outputs from each feature sub-model 101 (for example, the prosodic feature sub-model 101-1) to all the feature weight calculation unit 102 (i.e., the prosodic feature weight calculation unit 102-1, the linguistic feature weight calculation unit 102-2, and the video feature weight calculation unit 102-3). Each feature weight calculation unit 102 (e.g., the prosodic feature weight calculation unit 102-1) compares the outputs from all the feature sub-models 101 (i.e., the prosodic feature sub-model 101-1, the linguistic feature sub-model 101-2, and the video feature sub-model 101-3) to determine the feature gate weight vector of the feature (i.e., the prosodic feature gate weight vector).

By using the paralinguistic information estimation model illustrated in FIG. 9, the paralinguistic information estimation model learning apparatus and the paralinguistic information estimation apparatus of the second embodiment can learn a paralinguistic information estimation model and estimate paralinguistic information in a similar procedure to that of the first embodiment.

The embodiments of the present invention have been described above in detail with reference to the drawings. However, specific configurations are not limited to those embodiments, and include any design change or the like within the scope not departing from the gist of the present invention. The various processing described above in the embodiments may be executed not only in chronological order as described, but also in parallel or individually according to the needs or the processing capability of the apparatus executing the processing.

Program and Recording Medium

When each processing function of each apparatus described in the above embodiments is realized by a computer, processing content of a function that each apparatus should have is described by a program. Then, by executing the program on a computer, various processing functions of each apparatus described above are implemented on the computer.

A program describing the processing content can be recorded on a computer-readable recording medium. As the computer-readable recording medium, for example, any recording medium such as a magnetic recording apparatus, an optical disk, a magneto-optical recording medium, and a semiconductor memory may be used.

Additionally, the program is distributed by, for example, selling, transferring, or lending a portable recording medium such as a DVD or CD-ROM on which the program is recorded. Further, the program may be stored in a storage device of a server computer and distributed by being transferred from the server computer to another computer via a network.

The computer that executes such a program first temporarily stores, for example, the program recorded on the portable recording medium or the program transferred from the server computer in a storage unit of the computer. Then, when executing the processing, the computer reads the program stored in its own storage unit and executes processing in accordance with the read program. Further, as another embodiment of the program, the computer may directly read the program from the portable recording medium and execute processing according to the program, and further, processing according to a received program may be sequentially executed each time the program is transferred from the server computer to the computer. Additionally, a configuration may be provided in which the program is not transferred from the server computer to the computer, but the processing described above is executed by a so-called application service provider (ASP) type service that achieves a processing function only by instructing the execution and acquiring the result. It is assumed that the program in the present embodiment includes information provided for processing by an electronic calculator and being equivalent to the program (such as data that is not a direct command to the computer, but has properties defining processing of the computer).

Additionally, in the present embodiment, although the present apparatus is configured by executing a predetermined program on a computer, at least a portion of these processing contents may be achieved by hardware.

REFERENCE SIGNS LIST 10-1 Utterance storage unit
10-2 Supervisor label storage unit
11 Feature extraction unit
12 Paralinguistic information estimation model learning unit
20 Paralinguistic information estimation model storage unit
21 Paralinguistic information estimation unit
100, 900 Paralinguistic information estimation model
101 Feature sub-model
102 Feature weight vector
103 Feature gate
104 Result integration sub-model
121 Feature sub-model learning unit
122 Feature weight calculation unit
123 Feature gate processing unit
124 Result integration sub-model learning unit

The invention claimed is:

1. A paralinguistic information estimation apparatus estimating paralinguistic information from an input utterance, the paralinguistic information estimation apparatus comprising:
a paralinguistic information estimation model store configured to store a paralinguistic information estimation model outputting, with a plurality of independent features as inputs, paralinguistic information estimation results;
a feature extractor configured to extract the plurality of independent features from an input utterance; and
a paralinguistic information estimator configured to estimate paralinguistic information of the input utterance from the plurality of independent features extracted from the input utterance, by using the paralinguistic information estimation model,
wherein the paralinguistic information estimation model includes,
for each of the plurality of independent features, a feature sub-model configured to output information to be used for estimation of paralinguistic information, based only on the feature,
for each of the plurality of independent features, a feature weight determiner configured to calculate a feature weight representing whether to use the feature for estimation of paralinguistic information, based on an output result of the feature sub-model,
for each of the plurality of independent features, a feature gate configured to weight the output result from the feature sub-model with the feature weight and output a result, and
a result integration sub-model configured to estimate the paralinguistic information, based on output results from all the feature gates.

2. The paralinguistic information estimation apparatus according to claim 1, wherein
the feature weight determiner calculates the feature weight, based on output results from the feature sub-models of all the features.

3. The paralinguistic information estimation apparatus according to claim 2, wherein
the paralinguistic information estimation model is a neural network-based model,
the feature weight is a fixed value or a in accordance with an input, and
the feature sub-models, the feature weights, and the result integration sub-model are integrally learned by using the plurality of independent features extracted from a plurality of learning utterances and supervisor labels assigned to the learning utterances.

4. The para linguistic information estimation apparatus according to claim 2, wherein
the feature sub-models are learned from the plurality of independent features extracted from a plurality of learning utterances and supervisor labels assigned to the learning utterances,
the feature weights are calculated for the respective features according to a predetermined rule determine, and
the result integration sub-model is learned from output results of all the feature gates and the supervisor labels.

5. The paralinguistic information estimation apparatus according to claim 1, wherein
the feature weight determiner calculates the feature weight according to $$w_k = w_x x_k + b_x \quad \text{[Math. 5]}$$

$$w_k = \sigma(w_x x_k + b_x) \quad \text{[Math. 6]}$$

where k denotes a feature number, $x_k$ denotes an output result of the feature sub-model, $w_k$ denotes the feature weight, $w_x$ denotes a matrix learned in advance, $b_x$ denotes a bias learned in advance, and $\sigma$ denotes an activation function.

6. The paralinguistic information estimation apparatus according to claim 1, wherein
the paralinguistic information estimation model is a neural network-based model,
the feature weight is a fixed value or a in accordance with an input, and
the feature sub-models, the feature weights, and the result integration sub-model are integrally learned by using the plurality of independent features extracted from a plurality of learning utterances and supervisor labels assigned to the learning utterances.

7. The para linguistic information estimation apparatus according to claim 1, wherein
the feature sub-models are learned from the plurality of independent features extracted from a plurality of learning utterances and supervisor labels assigned to the learning utterances,
the feature weights are calculated for the respective features according to a predetermined rule determine, and
the result integration sub-model is learned from output results of all the feature gates and the supervisor labels.

8. A paralinguistic information estimation method estimating paralinguistic information from an input utterance, the paralinguistic information estimation method comprising:
storing, by a paralinguistic information estimation model store, paralinguistic information estimation model outputting, with a plurality of independent features as inputs, paralinguistic information estimation results;
extracting, by a feature extractor, the plurality of independent features from the input utterance; and
estimating, by a paralinguistic information estimator, paralinguistic information of the input utterance from the plurality of independent features extracted from the input utterance, by using the paralinguistic information estimation model, wherein the paralinguistic information estimation model includes, for each of the plurality of independent features, a feature sub-model configured to output information to be used for estimation of paralinguistic information, based only on the feature, for each of the plurality of independent features, a feature weight determiner configured to calculate a feature weight representing whether to use the feature for estimation of paralinguistic information, based on an output result of the feature sub-model, for each of the plurality of independent features, a feature gate configured to weight the output result from the feature sub-model with the feature weight and output a result, and a result integration sub-model configured to estimate the paralinguistic information, based on output results from all the feature gates.

9. The paralinguistic information estimation method according to claim 8, wherein the paralinguistic information estimation model is a neural network-based model, the feature weight is a fixed value or a function in accordance with an input, and the feature sub-model, the feature weight, and the result integration sub-model are integrally learned by using the plurality of independent features extracted from a plurality of learning utterances and supervisor labels assigned to the learning utterances.

10. The paralinguistic information estimation method according to claim 8, wherein the feature weight determiner calculates the feature weight, based on output results from the feature sub-models of all the features.

11. The paralinguistic information estimation method according to claim 10, wherein the paralinguistic information estimation model is a neural network-based model, the feature weight is a fixed value or a function in accordance with an input, and the feature sub-model, the feature weight, and the result integration sub-model are integrally learned by using the plurality of independent features extracted from a plurality of learning utterances and supervisor labels assigned to the learning utterances.

12. The paralinguistic information estimation method according to claim 10, wherein the feature sub-models are learned from the plurality of independent features extracted from a plurality of learning utterances and supervisor labels assigned to the learning utterances, the feature weights are calculated for the respective features according to a predetermined rule determine, and the result integration sub-model is learned from output results of all the feature gates and the supervisor labels.

13. The paralinguistic information estimation method according to claim 8, wherein the feature weight determiner calculates the feature weight according to $$w_k = w_x x_k + b_x \quad \text{[Math. 5]}$$

or $$w_k = \sigma(w_x x_k + b_x) \quad \text{[Math. 6]}$$

where k denotes a feature number, $x_k$ denotes an output result of the feature sub-model, $w_k$ denotes the feature weight, $w_x$ denotes a matrix learned in advance, $b_x$ denotes a bias learned in advance, and $\sigma$ denotes an activation function.

14. The paralinguistic information estimation method according to claim 8, wherein the feature sub-models are learned from the plurality of independent features extracted from a plurality of learning utterances and supervisor labels assigned to the learning utterances, the feature weights are calculated for the respective features according to a predetermined rule determine, and the result integration sub-model is learned from output results of all the feature gates and the supervisor labels.

15. A computer-readable non-transitory recording medium storing computer-executable program instructions that when executed by a processor cause a computer system to:

store, by a paralinguistic information estimation model store, a paralinguistic information estimation model outputting, with a plurality of independent features as inputs, paralinguistic information estimation results;

extract, by a feature extractor, the plurality of independent features from the input utterance; and estimate, by a paralinguistic information estimator, paralinguistic information of the input utterance from the plurality of independent features extracted from the input utterance, by using the paralinguistic information estimation model, wherein the paralinguistic information estimation model includes, for each of the plurality of independent features, a feature sub-model configured to output information to be used for estimation of paralinguistic information, based only on the feature, for each of the plurality of independent features, a feature weight determiner configured to calculate a feature weight representing whether to use the feature for estimation of paralinguistic information, based on an output result of the feature sub-model, for each of the plurality of independent features, a feature gate configured to weight the output result from the feature sub-model with the feature weight and output a result, and a result integration sub-model configured to estimate the paralinguistic information, based on output results from all the feature gates.

16. The computer-readable non-transitory recording medium of claim 15, wherein the paralinguistic information estimation model is a neural network-based model, the feature weight is a fixed value or a function in accordance with an input, and the feature sub-model, the feature weight, and the result integration sub-model are integrally learned by using the plurality of independent features extracted from a plurality of learning utterances and supervisor labels assigned to the learning utterances.

17. The computer-readable non-transitory recording medium of claim 15, wherein the feature weight determiner calculates the feature weight, based on output results from the feature sub-models of all the features.

18. The computer-readable non-transitory recording medium of claim 17, wherein
- the paralinguistic information estimation model is a neural network-based model,
- the feature weight is a fixed value or a function in accordance with an input, and
- the feature sub-model, the feature weight, and the result integration sub-model are integrally learned by using the plurality of independent features extracted from a plurality of learning utterances and supervisor labels assigned to the learning utterances.

19. The computer-readable non-transitory recording medium of claim 15, wherein
- the feature weight determiner calculates the feature weight according to $$w_k = w_x x_k + b_x \quad [\text{Math. 5}]$$

or $$w_k \sigma(w_x x_k + b_x) \quad [\text{Math. 6}]$$

where k denotes a feature number, $x_k$ denotes an output result of the feature sub-model, $w_k$ denotes the feature weight, $w_x$ denotes a matrix learned in advance, $b_x$ denotes a bias learned in advance, and $\sigma$ denotes an activation function.

20. The computer-readable non-transitory recording medium of claim 15, wherein
- the feature sub-models are learned from the plurality of independent features extracted from a plurality of learning utterances and supervisor labels assigned to the learning utterances,
- the feature weights are calculated for the respective features according to a predetermined rule determine, and
- the result integration sub-model is learned from output results of all the feature gates and the supervisor labels.

* * * * *